United States Patent
Zhang et al.

(10) Patent No.: US 10,536,194 B2
(45) Date of Patent: Jan. 14, 2020

(54) APPARATUS AND METHOD FOR EXCHANGING SIGNALING INFORMATION IN COMP

(71) Applicant: Alcatel Lucent, Boulogne Billancourt (FR)

(72) Inventors: Min Zhang, Swindon (GB); Matthew Baker, Canterbury (GB); Zhilan Xiong, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 29 days.

(21) Appl. No.: 14/910,717

(22) PCT Filed: Jul. 17, 2014

(86) PCT No.: PCT/IB2014/001601
§ 371 (c)(1),
(2) Date: Feb. 8, 2016

(87) PCT Pub. No.: WO2015/019173
PCT Pub. Date: Feb. 12, 2015

(65) Prior Publication Data
US 2016/0197654 A1    Jul. 7, 2016

(30) Foreign Application Priority Data
Aug. 9, 2013   (CN) .......................... 2013 1 0347579

(51) Int. Cl.
*H04B 7/02*    (2018.01)
*H04B 7/024*    (2017.01)
(Continued)

(52) U.S. Cl.
CPC ........... *H04B 7/024* (2013.01); *H04B 7/0478* (2013.01); *H04B 7/0626* (2013.01)

(58) Field of Classification Search
CPC .... H04B 7/024; H04B 7/0478; H04B 7/0626; H04B 7/0639
See application file for complete search history.

(56) References Cited

U.S. PATENT DOCUMENTS

2010/0232539 A1* 9/2010 Han ...................... H04B 7/024
375/285
2010/0273514 A1* 10/2010 Koo ...................... H04B 7/024
455/501
(Continued)

FOREIGN PATENT DOCUMENTS

JP    2012-533206 A    12/2012
JP    2016-513375 A    5/2016
(Continued)

OTHER PUBLICATIONS

NTT Docomo, "Views on Uplink Enhancement for Dense Small Cell Operation," $3^{rd}$ Generation Partnership Project (3GPP), 3GPP TSG RAN WG1 Meeting #72bis, R1-131423, pp. 1-7, XP050697268, Chicago, USA, Apr. 15-19, 2013.
(Continued)

*Primary Examiner* — Walli Z Butt
(74) *Attorney, Agent, or Firm* — Fay Sharpe LLP

(57) ABSTRACT

The present invention is related to an apparatus and method for signaling information exchanging in CoMP (Coordinated Multi-Point). According to an embodiment of the present invention, in a method for signaling information exchanging, a service TP (Transmission Point) and at least one neighboring TP provide the CoMP to at least one UE (User Equipment). The method comprises receiving by the service TP a precoder feedback from at least one UE, wherein the precoder is specific to one of the least one neighboring TP. The service TP decides if the precoder should be sent to the specific neighboring TP. If affirmative, the service TP com-
(Continued)

presses an indicator indicating the precoder and sends the compressed indicator to the specific neighboring TP.

8 Claims, 5 Drawing Sheets

(51) Int. Cl.
*H04B 7/0456* (2017.01)
*H04B 7/06* (2006.01)

(56) References Cited

U.S. PATENT DOCUMENTS

| | | | |
|---|---|---|---|
| 2012/0128050 A1* | 5/2012 | Xu | H04B 7/0617 375/224 |
| 2013/0064207 A1* | 3/2013 | Wang | H04B 7/0456 370/329 |
| 2013/0279403 A1* | 10/2013 | Takaoka | H04L 5/0035 370/328 |
| 2014/0254531 A1* | 9/2014 | Lee | H04L 5/006 370/329 |
| 2016/0028448 A1* | 1/2016 | Park | H04B 7/26 375/267 |

FOREIGN PATENT DOCUMENTS

| | | |
|---|---|---|
| TW | 201320686 A | 5/2013 |
| WO | 2011/005048 A2 | 1/2011 |
| WO | WO 2011/013887 A1 | 2/2011 |
| WO | 2014/163169 A1 | 10/2014 |

OTHER PUBLICATIONS

International Search Report for PCT/IB2014/001601 dated Apr. 9, 2015.

"3rd Generation Partnership Project; Technical Specification Group Radio Access Network; Evolved Universal Terrestrial Radio Access Network (E-UTRAN); X2 application protocol (X2AP) (Release 11)" 3GPP TS 36.423 V11.5.0 (Jun. 2013), Technical Specification, 7 pages, Sections 8.3.1.2 and 9.1.2.1.

LG Electronics, "Feedback information for downlink coordinated scheduling/beamforming", 3GPP TSG RAN WG1 Meeting #57, R1-092111, San Francisco, USA, May 4-8, 2009, Agenda item: 15.2, Document for: Discussion, 3 pages.

\* cited by examiner

APPARATUS AND METHOD FOR EXCHANGING SIGNALING INFORMATION IN COMP

TECHNICAL FIELD

The present invention generally relates to signaling technology in wireless communications and, specifically, relates to an apparatus and method for exchanging signaling information in coordinated multi-point (CoMP).

BACKGROUND OF THE INVENTION

CoMP transmission/reception has been considered as a promising technology by 3GPP (3rd Generation Partnership Project) LTE-A (Long Term Evolution-Advanced) due to its potential to improve coverage, cell-edge throughput, and/or spectrum efficiency transmission. Since coordinated scheduling/beamforming (CS/CB) does not require data sharing among multiple transmission points (TPs), it has become the most feasible implementation scheme for CoMP in the case of X2-based multiple eNBs (evolved Node Bases) coordination. In CB, the transmit-side precoding applied to downlink transmissions is coordinated between TPs in order to reduce interference between the coverage areas of different TPs. In CS, transmission powers and resource allocations are coordinated in order to reduce interference.

Typically, CS/CB requires tight coordinated and synchronized decisions among eNBs within a cooperating cluster. However, for a realistic network, backhauls are not ideal and typically have approximately 15 to 60 ms delays. Such delays may impact the coordination efficiency of CS/CB, and lead to great design challenges for CS/CB.

Given the above, the X2 interface used for exchanging signaling information between eNBs should provide robust information with respect to the delay and be capable of assisting each eNB to make proper decisions and benefit the whole network with synergy. Therefore, an enhanced X2 signaling is required.

BRIEF SUMMARY OF THE INVENTION

Embodiments of the present invention provide an apparatus and method for exchanging X2 signaling information, which can be applied to the realistic network with delay.

Some embodiments according to the present invention provide a method for signaling information exchanging in CoMP (Coordinated Multi-Point), wherein a service TP (Transmission Point) and at least one neighboring TP provide the CoMP to at least one UE (User Equipment). The method comprises receiving by the service TP a precoder feedback from the at least one UE, wherein the precoder is specific to one of the least one neighboring TP, deciding by the service TP if the precoder is sent to the specific neighboring TP, and if affirmative, compressing by the service TP an indicator indicating the precoder and sending the compressed indicator to the specific neighboring TP.

According to other embodiments, the compressed indicator indicates a part of the precoder, a precoder group including the precoder with similar network severity/cost, the worst CSI process or CSI-RS or CSI-IMR of the specific neighboring TP, or the precoder with X2-based codebook subsampling. The signaling information indicates a cell ID of the specific neighboring TP. In some embodiments, the method further includes signaling a severity/cost indicator to indicate the potential cost from the specific neighboring TP to the service TP. In the frequency domain, the payload size of the signaling information is compressed by using large subband size for information exchanging. In the time domain, the method applies a timer or time restriction to indicate the validity of period of the signaling information or indicate selected subframes to be protected by the signaling information.

Embodiments of the present invention also provide an apparatus for signaling information exchanging in CoMP. The apparatus comprises a receiver for receiving one precoder feedback from the at least one UE, wherein the precoder is specific to one of the least one neighboring TP, a scheduling processor for deciding if the precoder is sent to the specific neighboring TP, and a compressor and transmitter for, if affirmative, compressing the indicator indicating the precoder and sending the compressed indicator to the specific neighboring TP.

Some embodiments of the present invention provide a method for signaling information exchanging in CoMP comprises evaluating by the service TP a potential severity/cost from one of the neighboring TP to the service TP, and sending by the service TP an indicator of the severity/cost indicating the potential severity/cost to the one neighboring TP.

According to other embodiments of the present invention, the indicator of the severity/cost indicates possible interference level with a certain transmission hypotheses for the one neighboring TP, possible transmission power threshold that the one neighboring TP should follow or restrict, or possible network capacity degradation with a certain transmission hypotheses for the one neighboring TP.

Embodiments of the present invention also provide an apparatus for signaling information exchanging in CoMP. The apparatus comprises an evaluator for evaluating a potential severity/cost from one of the neighboring TP to the service TP, and a transmitter for sending the indicator of the severity/cost indicating the potential severity/cost to the one neighboring TP.

Accordingly, the present invention is advantageous in TP specific and distributed scheduling, and can efficiently support CoMP in the realistic network.

DETAILED DESCRIPTION OF THE INVENTION

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

The current signaling for CS, known as RNTP (relative narrowband transmit power), OI (overload indicator), and HII (high interference indicator), is transmitted by way of broadcasting. In such signaling, a bitmap corresponding to each PRB (Physical Resource Block) in the frequency domain indicates a relative downlink transmission power level by RNTP, a relative uplink transmission power level by HII, and a relative uplink interference level by OI. Due to non-ideal backhaul with a short or long delay of information exchanging, centralized scheduling may not work. Thus, such RNTP, OI and HII signaling limit the downlink and uplink coordination information.

The present invention solves the above issues by providing a feasible solution to support CS/CB with enhanced X2 signaling under the constraint of non-deal backhaul. The present invention identifies the most important scheduling information which is robust and flexible enough to cope with dynamic channel condition, traffic load, backhaul delay and limited backhaul capacity.

In the latest LTE/LTE-A, multiple CSI processes and IMR (Interference Measurement Resource) are introduced, which can provide opportunities for simultaneous CSI measurements for multiple TPs. The multiple CSI processes lead to certain tactic advantage of channel measurement by identifying and measuring some specific interference sources, for example, in CoMP scenario 3 with different cell identifiers (IDs).

Figure 1:
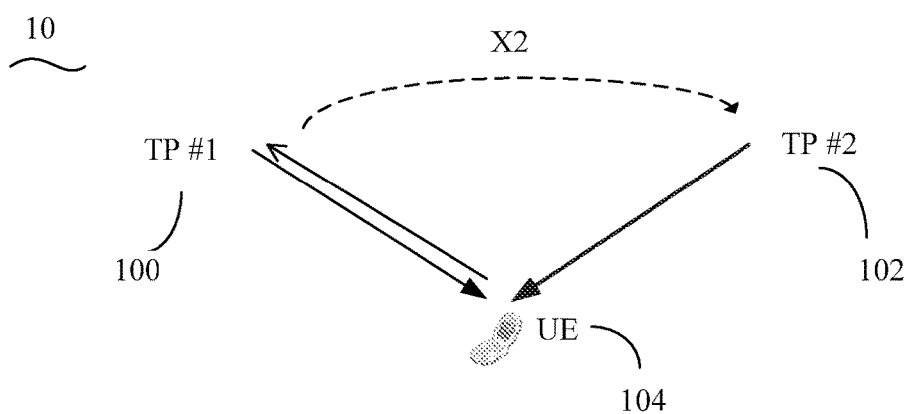
FIG. 1 is a schematic diagram showing a system for CoMP communications according to an embodiment of the present invention.

FIG. 1 is a schematic diagram showing a system adopting the CoMP according to an embodiment of the present invention.

As shown in FIG. 1, a service TP 100 and at least one neighboring TP 102 provide the CoMP to at least one UE (User Equipment) 104. That is, the UE 104 is attached or served by service TP 100. Assuming the UE 104 is configured with two CSI processes, one is from its own serving cell, i.e., from the service TP 100 and the other one is from a dominant interference cell, i.e., from the neighboring TP 102.

From CS/CB point of view, such a UE 104 is served by the service TP 100 unless it has been handed over to the neighboring TP 102. Moreover, the nature of a distributed scheduling may similarly mean that the service TP 100 does not require or expect any acknowledge/confirmation information from the neighboring TP 102 regarding the information originated from the service TP 100 through X2 interface. The service TP 100 can take into account X2 signaling originated from the neighboring TP 102 and other TPs during its own scheduling decision.

Similar with uplink overload indicator (OI), X2 signaling can be used to exchange some information to advise the neighboring TP 102 to avoid some downlink scheduling decisions for the own benefits of the service TP 100. The X2 signaling in the present invention can be TP-specific and include a Cell ID, rather than some kind of broadcast information, which largely distinguish the present invention from the existing OI.

Possible coordinated messages conveyed by X2 signaling of the present invention may include all or part of following information:

Precoder Indicator

Figure 2:
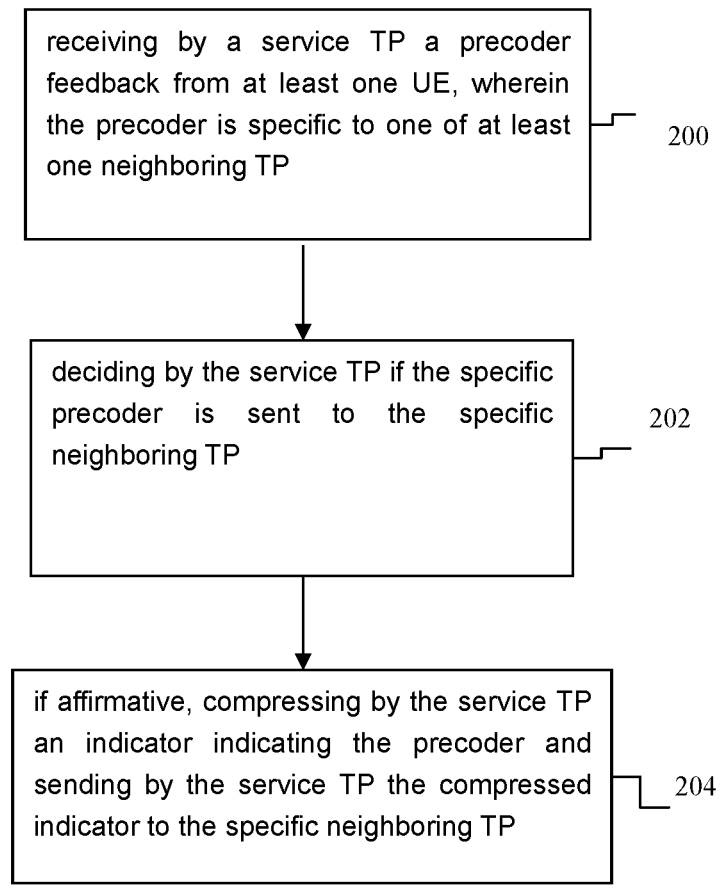
FIG. 2 is a flow chart illustrating a method for signaling information exchanging in a CoMP system in accordance with an embodiment of the present application.
Figure 3:
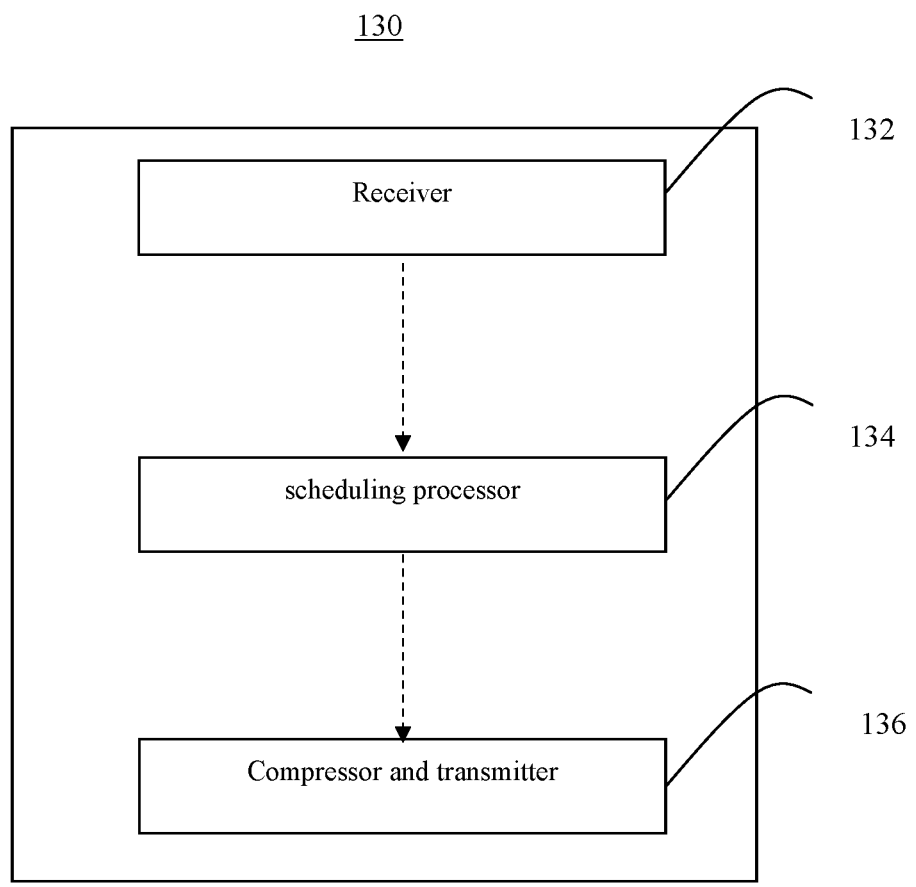
FIG. 3 is a block diagram illustrating an apparatus for signaling information exchanging in a CoMP system in accordance with an embodiment of the present invention.

FIG. 2 is a flow chart illustrating a method for signaling information exchanging in CoMP in accordance with an embodiment of the present application. FIG. 3 is a block diagram illustrating an apparatus 130 for signaling information exchanging in CoMP in accordance with an embodiment of the present invention. The apparatus 130 may be the service TP 100 shown in FIG. 1.

As shown in FIGS. 2 and 3, the method includes:

In step 200, a precoder feedback from the UE 104 is received by the service TP 100, for example, the receiver 132, wherein the precoder is specific to the neighboring TP 102. In step 202, whether the precoder is sent to the specific neighboring TP 102 is decided by the service TP 100, for example, the scheduling processor 134. If affirmative, then in step 104, the precoder indicator is compressed by the service TP 100, for example, the compressor and transmitter 136, and the compressed indicator is sent to the specific neighboring TP 102.

In some embodiments of the present invention, the precoder decided to be sent may be the worst (from the service TP 100 point view, the same hereafter). In an embodiment of the present invention, the compressed indicator may indicate a part of the precoder, such as with the first codebook index of dual codebook structure, a precoder group including the precoder with similar network severity/cost, the worst CSI process or CSI-RS or CSI-IMR of the specific neighboring TP, i.e. the neighboring TP 102, or the worst companion precoder(s) with X2-based codebook subsampling.

For example, in the spatial domain a precoder indicator may indicate one or more worst companion precoders that should be avoided by the neighboring TP 102.

Specifically, in some embodiments, for a dual codebook based TPs 100 and 102, the precoder is W1 only to indicate a part of the precoder, or a joint precoder with W1 and W2 if the channel condition is static enough.

In some embodiments, such worst companion precoder(s) can be grouped together if such a group of worst companion precoders has similar impact to the service TP 100, e.g. having similar interference level to the UE 104.

In some embodiments, the worst companion precoder(s) can be an index of CSI process of the neighboring TP 102, or an index of CSI-RS or CSI-IMR of the neighboring TP 102. For example, the neighboring TP 102 may be configured with more than one CSI processes and the UE 104 measures multiple beams from neighboring TP 102, e.g. inner and outer beams. Thus, an index of CSI process of neighboring TP 102 simply suggests that one of beams from the neighboring TP 102 causes stronger interference than other beams for the UE 104 at given PRBs (Physical Resource Blocks). In addition, the configuration of CSI-RS or CSI-IMR also is used to distinguish the worst companion precoder.

In some embodiments, such worst companion precoder(s) can be subsampled to reduce overhead of X2 signaling and be more robust to the delay of non-ideal backhaul. The subsampling can be based on existing PUCCH (Physical uplink control channel) codebook subsampling mechanism with fixed overhead, or based on codebook subset restriction. Subsampling based on codebook subset restriction of the present invention takes into account a variety of non-ideal backhaul delay, instead of reusing codebook subset restriction dedicated for uplink feedback. Consequently the payload size of indicating worst companion precoder(s) can be based on actual X2-based codebook subset restriction and can be relatively small and different, e.g. 1 or 2 bits.

Severity/Cost Indicator

The Severity/Cost indicator indicates the potential severity/cost to the service TP 100 if the neighboring TP 102 uses a given combination of precoders, and/or frequency unit, and/or time unit. The precoders may be one precoder or a group of precoders. The frequency unit may be a PRB, a subband, or a whole bandwidth. Time unit may include one or more subframes. The "severity" or "cost" takes into account the following factors:

1) the number of the service TP 100's UEs, such as UE 104 that is reported the given combination;

2) PRB resource utilization of the service TP 100's UEs, such as UE 104 that is reported the given combination;

3) a combined average data rate of such UEs;

4) how often the given combination was reported by one of more of the service TP 100's UEs, such as UE 104; and 5) an estimate of the total or average loss of throughput (sum rate) in the service TP 100 as a result of the neighboring TP 102 using the given combination with a given power level (e.g. maximum PSD (Power Spectral Density)).

Figure 4:
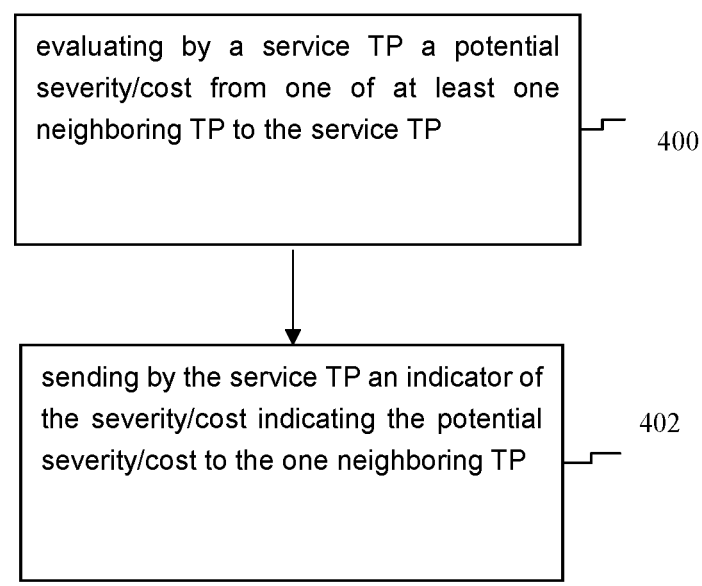
FIG. 4 is a flow chart illustrating a method for signaling information exchanging in a CoMP system in accordance with another embodiment of the present application.
Figure 5:
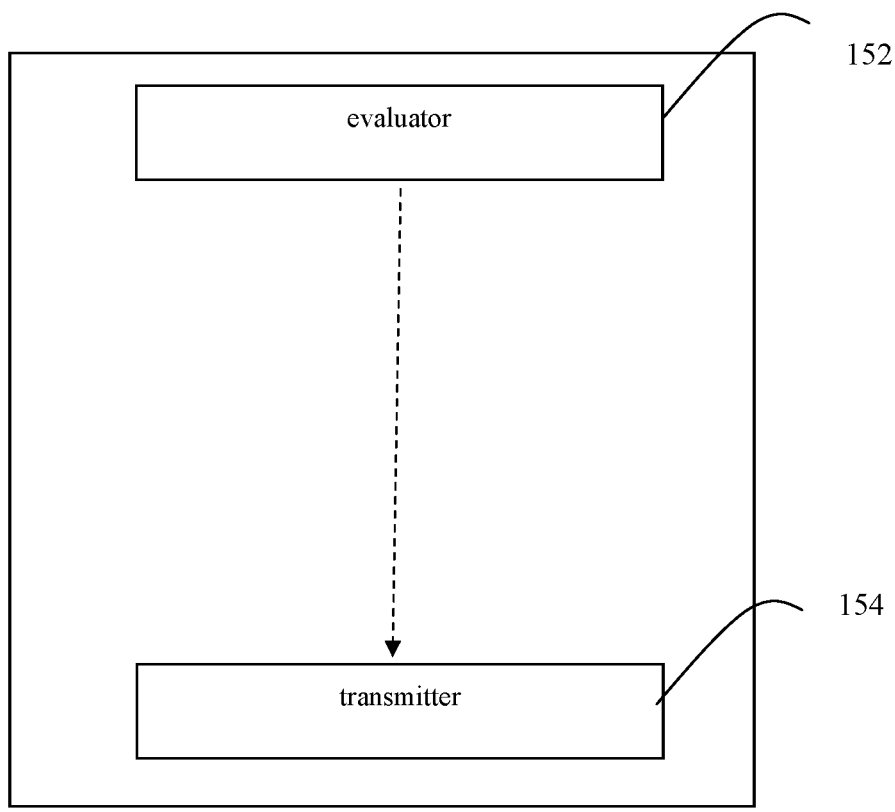
FIG. 5 is a block diagram illustrating an apparatus for signaling information exchanging in a CoMP system in accordance with another embodiment of the present invention.

FIG. 4 is a flow chart illustrating a method for signaling information exchanging in CoMP in accordance with another embodiment of the present application. FIG. 5 is a block diagram illustrating an apparatus 150 for signaling information exchanging in CoMP in accordance with another embodiment of the present invention. The apparatus 150 may be the service TP 100 shown in FIG. 1.

As shown in FIGS. 4 and 5, the method includes: in step 400, a potential severity/cost from the neighboring TP 102 to the service TP 100 is evaluated by the service TP 100, for example, the evaluator 152. In step 402, an indicator of the severity/cost indicating the potential severity/cost to the neighboring TP 102 is sent by the service TP 100, for example, the transmitter 154.

For example, in the interference domain: interference from the neighboring TP 102 is used as a severity/cost indicator, which indicates whether the interference level from the neighboring TP 102 to the service TP 100 exceeds a given threshold within selected PRBs if the neighboring TP 102 uses precoder(s) indicated by the above precoder indicator.

In some embodiments, the severity/cost indicator in downlink CoMP may have one or more interference thresholds which can be either defined specifically, e.g. −80/−100/−120/−140 dBm, or defined roughly, e.g. non-related/low/medium/high. "Non-related" interference means that there is no need for any restriction from the neighboring TP 102 within some PRBs because those PRBs are unlikely used for the service TP 100 within next subframes.

In some embodiments, depending on the number of interference thresholds, the severity/cost indicator can be a Boolean if only one downlink interference threshold is defined, or a multi-level indicator like 0/1/2/3 corresponding to pre-defined interference thresholds.

In some embodiments, the severity/cost indicator is also TP specific based on CSI feedback and is reported using multiple CSI processes. Therefore the service TP 100 estimates the interference leakage originated from the neighboring TP 102 with assumed transmission power, which has been pre-configured in the CSI process associated with the neighboring TP 102, and the above worst companion precoder(s). The interference leakage may be for the neighboring TP 102 only by excluding the interference outside the service TP 100 and the neighboring TP 102.

On the other hand, in the power domain: the transmission power of the neighboring TP 102 is used as a severity/cost indicator, which indicates the transmission power from the neighboring TP 102 is reduced to a certain threshold within selected PRBs if the neighboring TP 102 uses precoder(s) indicated by the above precoder indicator.

Similarly, in some embodiments, the severity/cost indicator may have one or more transmission power thresholds which can be defined specifically, e.g. −80/−100/−120/−140 dBm or defined differentially, e.g. −6 dB/−3 dB/0 dB power down with respect to the power level signaled in the configuration of CSI process. The severity/cost can also be defined roughly, e.g. low/medium/full, where "low" means that the neighboring TP 102 should use low transmission power at some PRBs if using the precoder(s) signaled by the precoder indicator and "Full" means that the neighboring TP 102 can transmit with full power if using precoder(s) signaled by the precoder indicator.

In addition, in the capacity domain: the capacity or throughput is used as a severity/cost indicator, which indicates the relative capacity or throughput loss of the service TP 100 if the neighboring TP 102 uses the worst companion precoder(s) indicated by the precoder indicator with assumed transmission power.

In some embodiments, since the exact algorithm for deriving the "severity" indicator could be defined roughly like the form of "high/medium/low", defined finely like a number on a scale of 1 to 10, or defined in related to a proportion of the throughput of the service TP 100, e.g. the highest value means "cost >50% of the throughput of the service TP 100", the lowest value means "cost <5% of the throughput of the service TP 100", and the other values are spaced uniformly in between.

Frequency Domain

The granularity of X2 signaling in the frequency domain according to the present invention is defined as the size of subband for information exchanging.

The finest granularity of X2 signaling is per PRB. However, considering the feedback granularity of CSI, limited backhaul capacity and limited accuracy of interference estimation at the service TP 100, the granularity of X2 signaling at frequency domain could be subband or other sizes indicated by X2 signaling. Within each grid of frequency domain, X2 signaling may contain one or multiple combinations of a precoder indicator which may include one or multiple worst companion precoders and/or a severity/cost indicator of the present invention.

These multiple combinations for each grid in frequency domain provide multiple transmission hypotheses of the neighboring TP 102. In an example, multiple transmission hypotheses may include the "worst" companion precoder(s) which give the strongest interference from the neighboring TP 102 and the highest score of the severity/cost indicator, and/or the "best" companion precoder(s) which gives the smallest interference from the neighboring TP 102 and the lowest score of the severity/cost indicator.

Note that even the "best" companion precoder used by the neighboring TP 102 may still lead to strong interference to the service TP 100 in some cases due to non-ideal orthogonality between precoders and variation of channel condition. Therefore it is preferred that the neighboring TP 102 can reduce the power or blanking at PRBs indicated by X2 signaling.

Time Domain

X2 signaling according to the present invention may include a timer of information credibility.

The information conveyed by X2 signaling given in the precoder(s), severity/cost and frequency domain may be valid within limited subframes due to channel coherence time and scheduling consideration of the service TP 100. Before next updating by X2 signaling which may not happen, or may be delayed seriously due to non-ideal backhaul, such timer provides a time window during which the neighboring TP 102 could take such X2 signaling into account. If such timer is expired, the neighboring TP 102 can completely ignore such information which is highly likely invalid.

The information in the precoder(s), severity/cost and frequency domain are also associated with an indicator of a subset of subframes for time domain restriction, e.g. some selected subframes should be protected from the service TP 100 point of view or restricted to be used following the enhanced X2-signalling according to the present invention.

With multiple CSI processes and measurement reports, the information conveyed by X2 signaling of the present invention can be different from existing RNTP, OI and HII signaling in order to support CS/CB more efficiently. Therefore the information conveyed by the enhanced X2 signaling of the present invention could be TP specific.

Further, the present invention adopts distributed scheduling. It extends a downlink equivalent of the OI, wherein richer information can be given with TP specific manner with limited information payload size so that neighboring TPs are advised by X2 interface to avoid some unfavorable scheduling decisions (if possible).

In addition, though only one simple CoMP involving a service TP, a neighboring TP, and an UE is illustrated according to some embodiments of the present invention, persons skilled in the art should understand the enhanced X2 signaling application to the complex CoMP system under the teaching and suggestion of the of the present invention.

While various embodiments of the present invention have been illustrated and described, it will be clear that the present invention is not limited to these embodiments. Numerous modifications, changes, variations, substitutions, and equivalents will be apparent to those skilled in the art, without departing from the spirit and scope of the present invention, as described in the claims.

What is claimed is:

1. A method for signaling information exchanging in CoMP (Coordinated Multi-Point), wherein a service TP (Transmission Point) and at least one neighboring TP provide the CoMP to at least one UE (User Equipment), the method comprising:
   evaluating by the service TP a potential cost of transmissions from one of the at least one neighboring TP to the service TP; and
   sending by the service TP an indicator of the cost indicating the potential cost to the one neighboring TP;
   wherein the indicator of the cost indicates one of a possible transmission power threshold that the one neighboring TP should follow or restrict, and a possible network capacity degradation with a certain transmission hypotheses for the one neighboring TP;
   wherein the indicator of the cost is indicated according to one of a plurality of pre-defined thresholds.

2. The method of claim 1, wherein the indicator of cost indicates a possible interference level with a certain transmission hypotheses for the one neighboring TP.

3. The method of claim 1, wherein the signaling information indicates a cell ID of the one neighboring TP.

4. The method of claim 1, further comprising signaling a compressed precoder indicator to the one neighboring TP.

5. The method of claim 1, further comprising, in the frequency domain, compressing the payload size of the signaling information by using large subband size for information exchanging.

6. The method of claim 1, further comprising, in the time domain, applying a timer or time restriction to indicate a valid period of the signaling information or indicate selected subframes to be protected by the signaling information.

7. An apparatus for signaling information exchanging in CoMP (Coordinated Multi-Point), wherein the apparatus services as a service TP (Transmission Point) and provides the CoMP to at least one UE (User Equipment) with at least one neighboring TP, the apparatus comprising:
   an evaluator for evaluating a potential cost of transmissions from one of the neighboring TP to the service TP; and
   a transmitter for sending an indicator of the cost indicating the potential cost to the one neighboring TP;
   wherein the indicator of the cost indicates one of a possible transmission power threshold that the one neighboring TP should follow or restrict, and a possible network capacity degradation with a certain transmission hypotheses for the one neighboring TP;
   wherein the indicator of the cost is indicated according to one of a plurality of pre-defined thresholds.

8. The apparatus of claim 7, wherein the indicator of cost indicates a possible interference level with a certain transmission hypotheses for the one neighboring TP.

* * * * *